Dec. 5, 1933. A. J. SPOHN 1,938,120
TRAILER TRACKING DEVICE
Filed Jan. 30, 1933 2 Sheets-Sheet 1
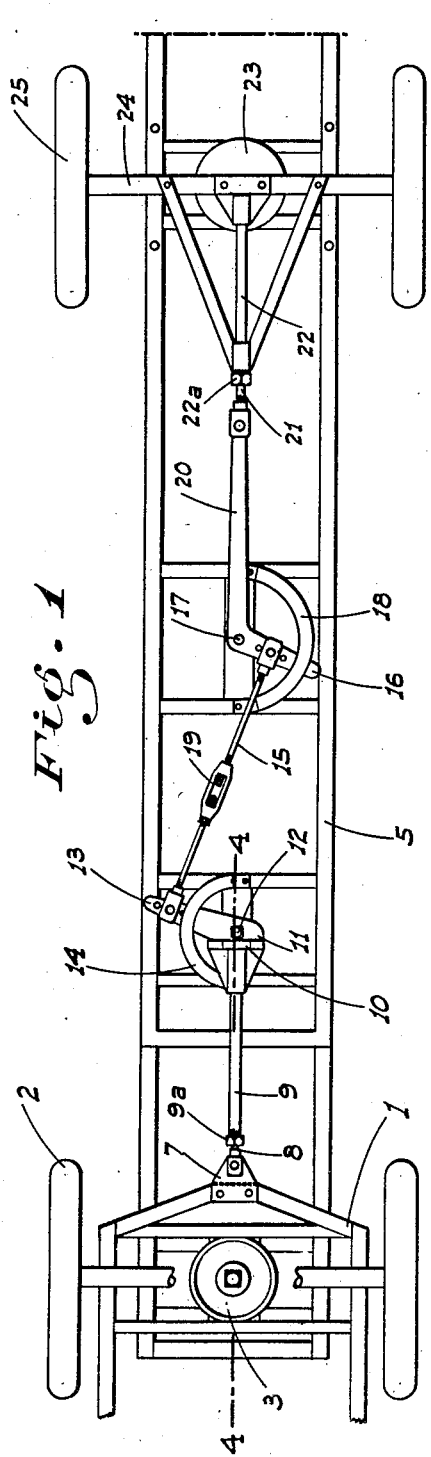
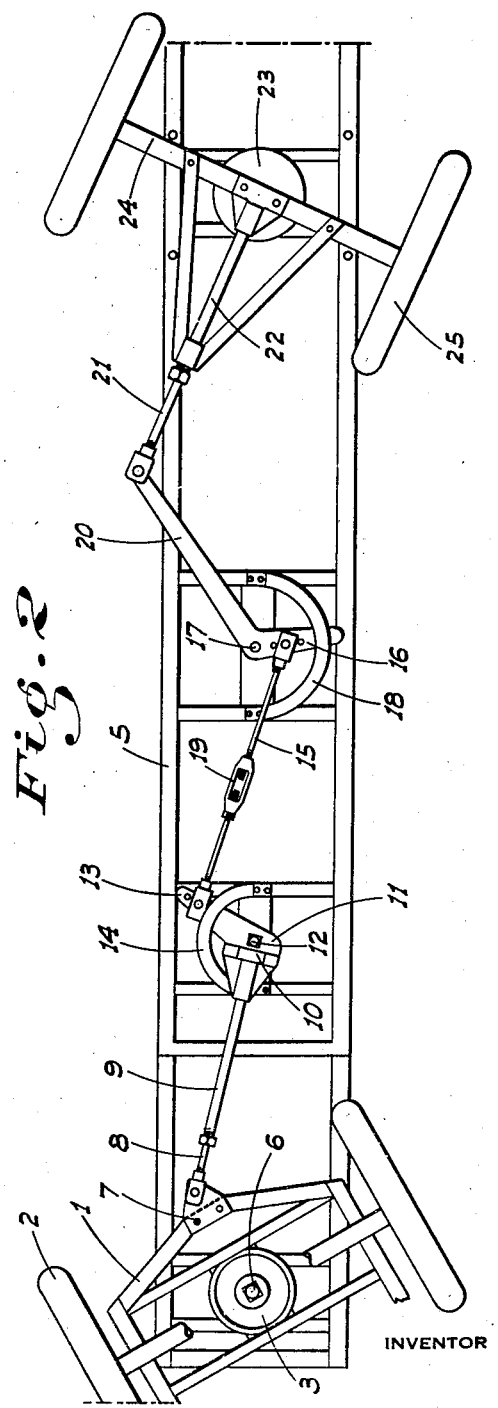
INVENTOR
A. J. Spohn
BY ATTORNEY Dec. 5, 1933.   A. J. SPOHN   1,938,120
TRAILER TRACKING DEVICE
Filed Jan. 30, 1933   2 Sheets-Sheet 2
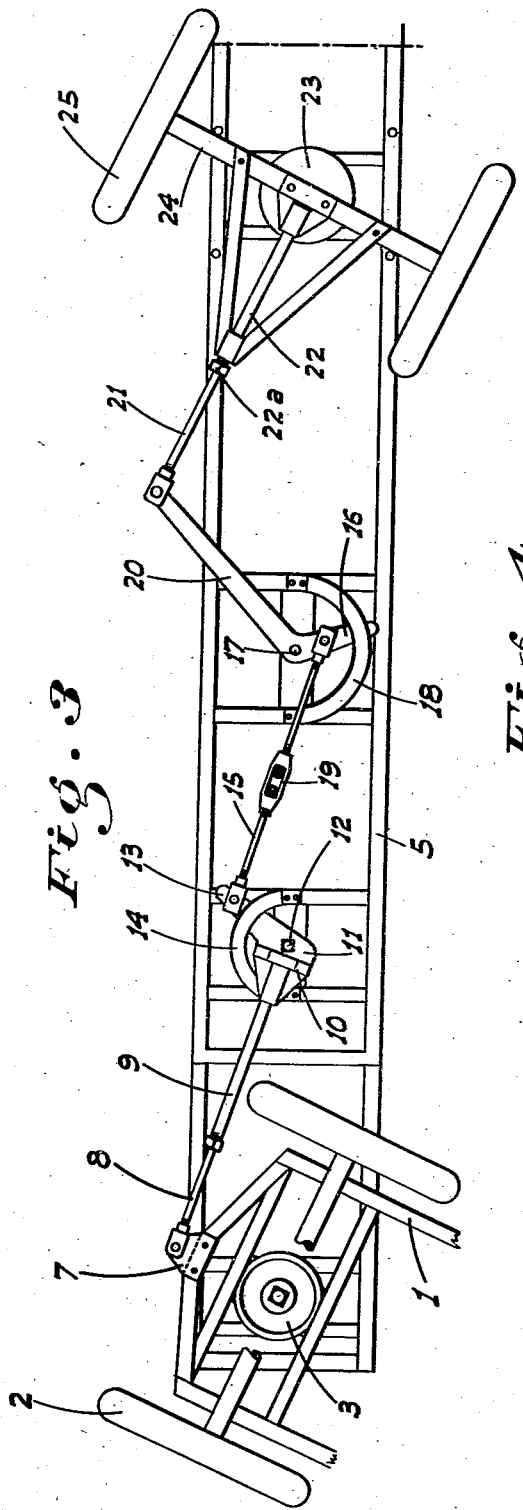
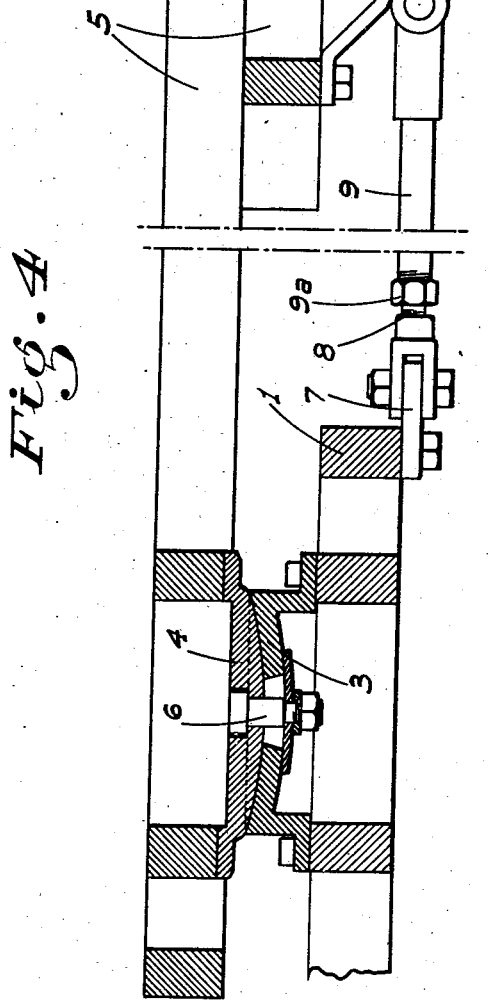
INVENTOR
A. J. Spohn
BY
ATTORNEY Patented Dec. 5, 1933

1,938,120

UNITED STATES PATENT OFFICE 1,938,120

TRAILER TRACKING DEVICE

Arthur J. Spohn, Merced, Calif.

Application January 30, 1933. Serial No. 654,118

6 Claims. (Cl. 280—100)

This invention relates to motor vehicle and trailer units, my principal object being to provide a unit of this character so constructed that as the motor vehicle turns toward one side or the other the rear wheels of the trailer will be automatically turned so as to follow or track with the turning of the vehicle. With this arrangement therefore it is unnecessary for the vehicle to "cut corners" when making a sharp turn as must now be done in order that the trailer shall properly follow the truck without danger of upsetting, and the danger and inconvenience to others on the highway in the immediate vicinity incident to this practice is eliminated.

Another object is to arrange the wheel turning mechanism so that the vehicle can if necessary be turned practically at right angles to the trailer, so that it can make a very sharp turn, without necessitating the use of any long drawbar between the vehicle and trailer and without the trailer wheels being turned to a correspondingly great degree and which would render the trailer liable to tip over.

A further object is to provide a structure of this character so arranged that no special motor vehicle is necessary, since the parts on the motor vehicle which are essential to the operation of the device can be installed on any standard motor truck chassis.

Since trailers are of course mostly used with motor trucks the term "truck" will be used in the specification hereinafter to designate the motor vehicle generally.

These objects I accomplish by means of such structure and relative arrangement of parts as will fully appear by a perusal of the following specification and claims.

In the drawings similar characters of reference indicate corresponding parts in the several views:

Fig. 1 is a bottom plan view of a trailer chassis as attached to a truck showing the position of the parts when traveling a straight path.

Fig. 2 is a similar view showing the position of the parts when the truck is turned through a certain arc toward one side.

Fig. 3 is a similar view showing the truck as turned to a position substantially at right angles to the trailer.

It may here be remarked that the above views are somewhat diagrammatic in character, no attempt having been made to show minute details of mounting and construction.

Fig. 4 is a fragmentary enlarged longitudinal section taken on the line 4—4 of Fig. 1.

Referring now more particularly to the characters of reference on the drawings, the numeral 1 denotes in general the frame of a motor truck at its rear end, supported by driven wheels 2 as usual. Mounted on the truck frame adjacent its rear end is the lower member 3 of a fifth wheel or turntable, the upper corresponding member 4 of which is mounted on the adjacent portion of the trailer frame 5 which overhangs the truck frame, a king bolt 6 connecting the members 3 and 4. Said members are preferably concave and convex respectively so as to be capable of universal turning movement relative to each other and thus permitting of angling movement of the trailer and truck frames relative to each other in a vertical plane as is sometimes necessary due to the irregular contour of roads. The bolt 6 of course engages one member of the fifth wheel in such a manner as to allow of the above universal movement. In order that the trailer frame need not be too high and consequently somewhat top-heavy, the major portion of its extent is disposed on a lower level than the front portion which overhangs the truck, as indicated in Fig. 4.

Secured to the truck frame 1 centrally of its width and at its rear end is a draw head plate 7 to which is swivelly connected the adjacent end of a plunger rod 8. This rod is slidable in a sleeve or cylinder 9 which at its rear end is hinged as at 10 in connection with a plate 11 for swinging movement in a vertical plate, while being rigid with said plate for movement in a horizontal plane. A stuffing gland 9a on the forward end of the cylinder enables the plunger rod to be maintained in a properly lubricated condition in said cylinder for easy and more wearing operation.

The plate 11 rearwardly of the hinge is turnably mounted on the trailer frame 5 by a pivot bolt 12 or the like. An arm 13 is formed with said plate and projects radially of the bolt in a direction laterally of the frame, being supported against downward sagging by a guide 14 secured to the trailer frame and concentric with the pivot 12. The arm adjacent its outer end is adjustably connected to the forward end of a link 15 which at its rear end is adjustably connected to an arm 16. This arm also projects laterally of the trailer frame but towards the opposite side thereof relative to the arm 13. Said arm 16 extends radially of a pivot bolt 17 mounted on the frame 5. It is also supported against downward movement by a guide 18 mounted on the trailer frame concentric with said pivot 17. The link is adjustable as to length by suitable means such as a turn buckle 19 forming a part of the same and disposed intermediate the ends thereof.

Another arm 20 rigid with the arm 16 projects radially of the pivot 17 and lengthwise of the trailer toward the rear end thereof, said arm 20 being constantly longer than the arm 16, and said arms together forming a bell crank. At its rear end the arm 20 is swivelly connected to the forward end of a plunger rod 21. This rod is slidable in a suitably braced cylinder 22 projecting forwardly and radially from and rigid with the fifth wheel unit 23 of the axle 24 of the supporting wheels 25 of the trailer, the cooperating member of the fifth wheel being of course secured on the truck frame. This swivel wheel truck is here shown as being a two-wheel or a pony truck, but it may be a four-wheel or bogie truck if desired, depending on the type of trailer and the service for which it is intended. A packing gland 22a is associated with the cylinder 22 for the same purpose as the gland 9a.

It may here be mentioned that all pivot bolts and turning or moving parts generally are preferably mounted in bronze or similar long-wearing bushings or other bearing elements, and are provided where necessary or desirable with anti-friction bearings so as to reduce wear and aid in the ease of operation.

In operation when the truck and trailer are longitudinally alined and traveling along a straight path, the cylinder 9, the arm 20 and the cylinder 22, besides the two fifth wheel units are disposed in common longitudinal alinement, and the wheels 25 are held in planes parallel to the trailer frame or so as to travel in a straight line. The wheels cannot of themselves shift from such alinement without actually pushing the trailer frame around about the fifth wheel 3—4 as an axis, on account of the interconnected parts between the rear fifth wheel 23 and the truck frame plate 7. This obviously will never happen so that the wheels 25 track straight ahead as long as the truck is similarly disposed.

When however the truck is steered toward one side, turning on the adjacent fifth wheel as an axis, the plate 7 is swung toward the opposite side of the longitudinal line of travel as shown in Fig. 2. This movement causes the cylinder 9 to be similarly swivelled about the pivot 12 as an axis, while the arm 13 turns toward the rear. At the same time the rod 8 moves out of the cylinder 9 somewhat, since the distance between the draw head plate and the fixed shaft 12 is increased as will be obvious. The rearward movement of the arm 13 pushes on the link 15, moving the arm 16 rearwardly and turning the arm 20 toward the same side of the trailer as that toward which the member 7 is turned. This results in swinging the rear wheel truck about its fifth wheel, as in Fig. 2, which is accompanied by a sliding of the rod 21 out of the cylinder 22, on account of the increase in distance between the outer end of the arm 20 and said fifth wheel 23. The same relative movement of parts is had but in the reverse direction when the truck is swung toward the opposite side of the trailer.

With a relatively great turning of the truck relative to the trailer, as shown in Fig. 3, but little further swinging of the wheels will be had. This is because when the truck thus swings beyond a certain angle the draw head 7 moves through an arc which then extends substantially lengthwise of the trailer. Such further movement of the draw head therefore merely causes the rod 8 to be pulled further out of its cylinder without imparting any appreciable movement to the swivel members connected thereto. Since said swivel members do not appreciably move no appreciable movement will likewise be imparted to the rear arm movement or to the swivel truck. In this manner the truck may make a very sharp turn relative to the trailer without the wheels 25 being correspondingly swung to such an extent as to cause the trailer frame to tend to tip over laterally.

As a matter of fact, the truck can turn to a position even further than 90° to the trailer if necessary. This is because the plunger 8 is long enough to permit of such movement and because the bracket 7 projects rearwardly from the truck sufficient to avoid contact of the extended plunger with the end of the truck frame even when the latter is thus excessively turned.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim is new and useful and desire to secure by Letters Patent is:

1. In combination with a motor vehicle, a trailer connected to the vehicle for turning movement relative thereto, a steerable wheel truck supporting the trailer toward its rear end, means between the vehicle and truck to cause the latter to swing with a turning of the vehicle relative to the trailer to one side or the other and means included with said first named means to permit of the vehicle being turned through a greater arc relative to the trailer than the wheel truck.

2. In combination with a motor vehicle, a trailer extending rearwardly of the vehicle, a pivot connection between said trailer and vehicle, steerable wheels supporting the trailer toward its rear end, a member secured to the rear end of the vehicle whereby with the turning of the latter about said pivot connection the member will move through an arc concentric with the pivot, means between the member and the wheels to steer the latter with such lateral movement of the member and means incorporated with said last named means whereby with a turning of the member through an arc greater than a certain length from a normal position, no movement will be imparted to the wheels.

3. In combination with a motor vehicle, a trailer overhanging and extending rearwardly of the vehicle, a pivot connection between said trailer and vehicle, a swivel wheel truck supporting the trailer toward its rear end, a tubular member pivoted at its rear end on the trailer rearwardly of the vehicle, a plunger slidable in the member and pivoted at its forward end on the vehicle rearwardly of said pivot connection whereby said member will swing laterally with a turning of the vehicle about said pivot connection, and instrumentalities connecting the member and the truck to swing the latter with a lateral movement of the member.

4. In combination with a motor vehicle, a trailer overhanging and extending rearwardly of the vehicle, a pivot connection between said trailer and vehicle ahead of the rear end of the latter, a swivel wheel truck supporting the trailer toward its rear end, an element pivoted on the trailer rearwardly of the vehicle, a member projecting forwardly from and connected to the element to swing therewith, means connecting the member to the vehicle to cause said member to swing laterally of the trailer with a turning of the vehicle about said pivot connection, an arm projecting laterally of the trailer from and rigid with the element, a horizontal bell crank pivoted on the trailer between the element and the wheel truck, one arm of said bell crank extending lengthwise of the trailer toward the truck and the other arm extending laterally of the trailer toward the side opposite said element arm, a link connecting said lateral arms, whereby with a lateral swinging of said member the first named bell crank arm will swing laterally and in the same direction, and means between said bell crank arm and the wheel truck to swing the latter in the opposite direction with the lateral movement of said ball crank arm.

5. A structure as in claim 4, in which said last named means comprises a tubular member projecting forwardly from the wheel truck radially of the axis of swivel movement thereof, and a rod slidably engaging said tubular member and pivoted at its forward end on the rear end of the longitudinal bell crank arm.

6. In combination with a motor vehicle, a trailer overhanging and extending rearwardly of the vehicle, a pivot connection between said trailer and vehicle ahead of the rear end of the latter, said connection being arranged to permit of angular movement of the trailer relative to the vehicle in a vertical plane, steerable wheels supporting the trailer toward its rear end, an element mounted on the trailer rearwardly of the vehicle for turning movement in a horizontal plane, means between said element and the wheels to steer the latter with a turning of said element, a cylinder projecting forwardly from and hingedly connected at its rear end to the element for swinging movement in a vertical plane and a rod slidably engaging the cylinder and pivoted at its forward end on the rear end of the vehicle.

ARTHUR J. SPOHN.